United States Patent [19]

Pinto et al.

[11] 4,417,837
[45] Nov. 29, 1983

[54] APPARATUS FOR GROUPING ARTICLES

[75] Inventors: Albert A. Pinto, White Plains, N.Y.; George Ryder, West Orange, N.J.

[73] Assignee: Nabisco, Inc., Parsippany, N.J.

[21] Appl. No.: 278,874

[22] Filed: Jun. 29, 1981

[51] Int. Cl.³ .............................................. B65G 57/00
[52] U.S. Cl. ..................................... 414/104; 414/47; 414/107
[58] Field of Search ................. 414/47, 103, 104, 106, 414/107, 32, 33; 271/134, 166, 178, 177, 181, 315

[56] References Cited

U.S. PATENT DOCUMENTS

| | | | |
|---|---|---|---|
| 2,684,161 | 7/1954 | Fay | 414/104 |
| 3,355,169 | 11/1967 | Seyl | 271/187 |
| 3,435,685 | 4/1969 | Watkin et al. | 414/107 X |
| 3,675,792 | 7/1972 | Griner et al. | 414/107 X |
| 3,866,905 | 2/1975 | Trogan et al. | 414/106 X |
| 3,876,083 | 4/1975 | Evans et al. | 414/47 X |
| 4,053,066 | 10/1977 | Lynch | 198/493 X |

FOREIGN PATENT DOCUMENTS 622611  12/1935  Fed. Rep. of Germany ...... 271/178

Primary Examiner—Robert J. Spar
Assistant Examiner—Janice Krizek
Attorney, Agent, or Firm—Gerald Durstewitz

[57] ABSTRACT

Apparatus for grouping articles in stacks of a predetermined number in which a wheel having serrated teeth picks off articles from the base of an infeed chute and places them on edge on a pair of inclined rails. The articles are held to the wheel by vacuum and are separated from the wheel by wedge members positioned adjacent the rails. A stack of articles builds on the rails and is slid into a conveyor bucket. After each predetermined number of articles is removed from the chute, a lever is actuated to hold the column of articles in the chute out of contact with the teeth to allow for advancement of the bucket conveyor.

8 Claims, 8 Drawing Figures

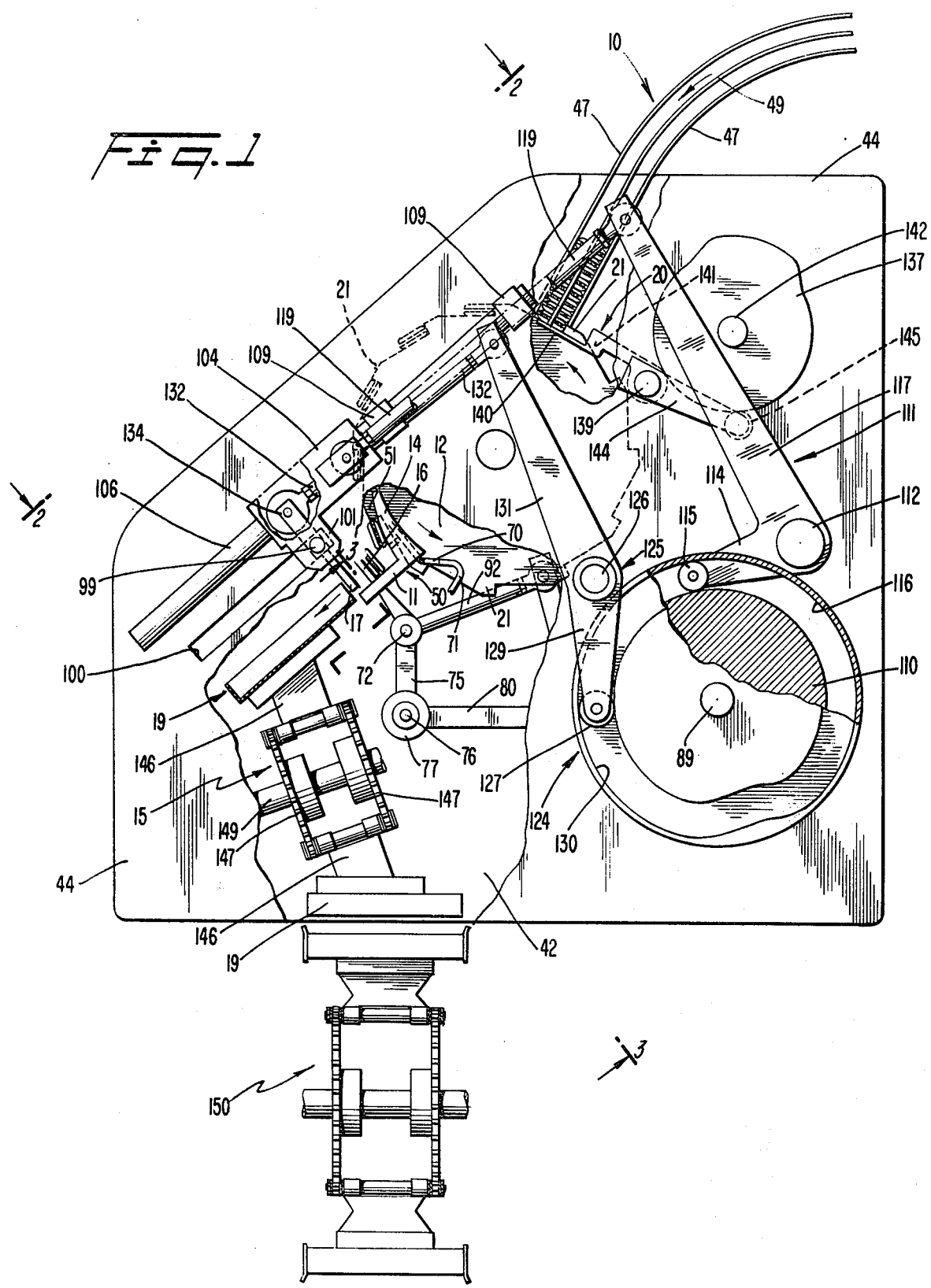

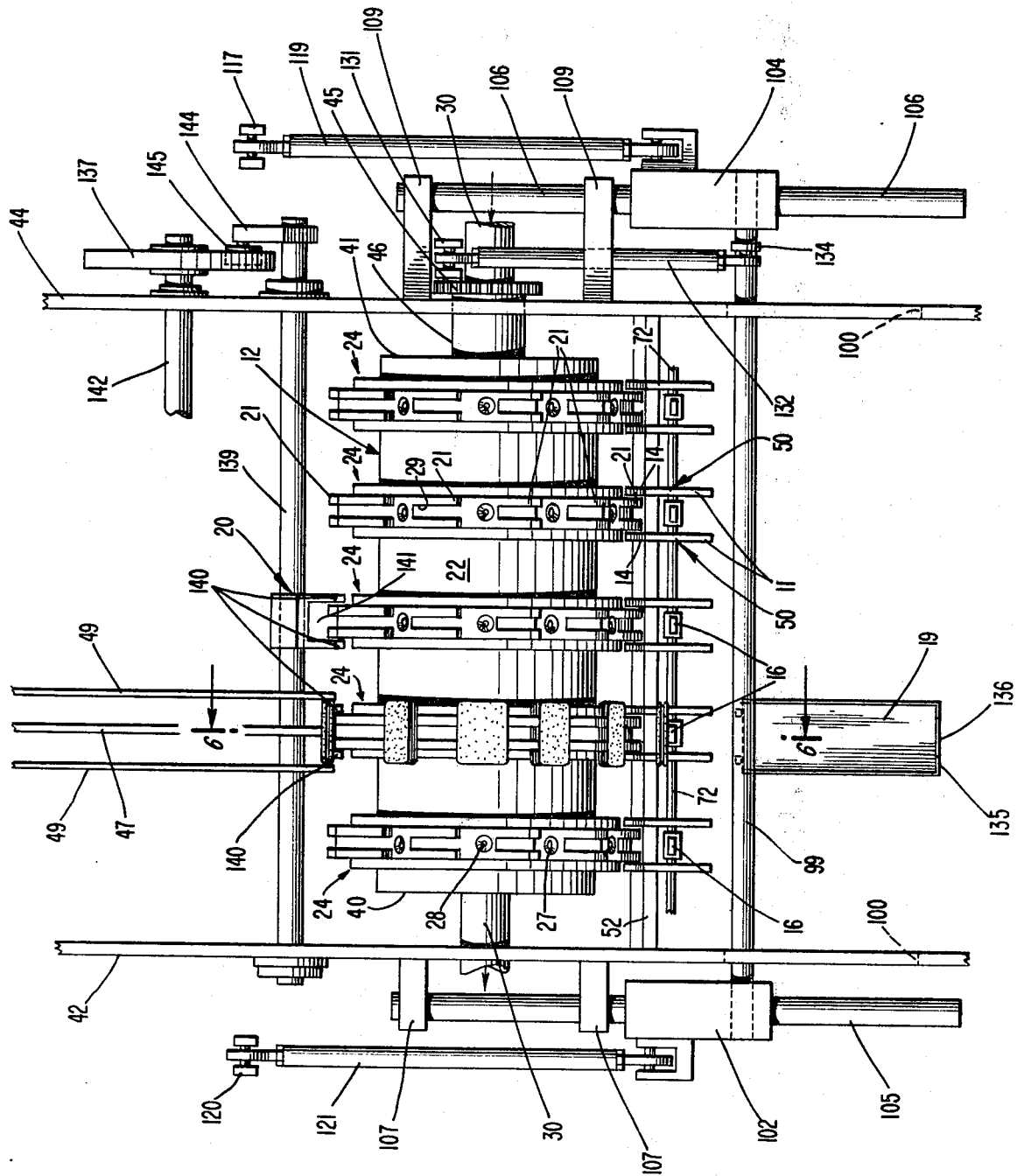

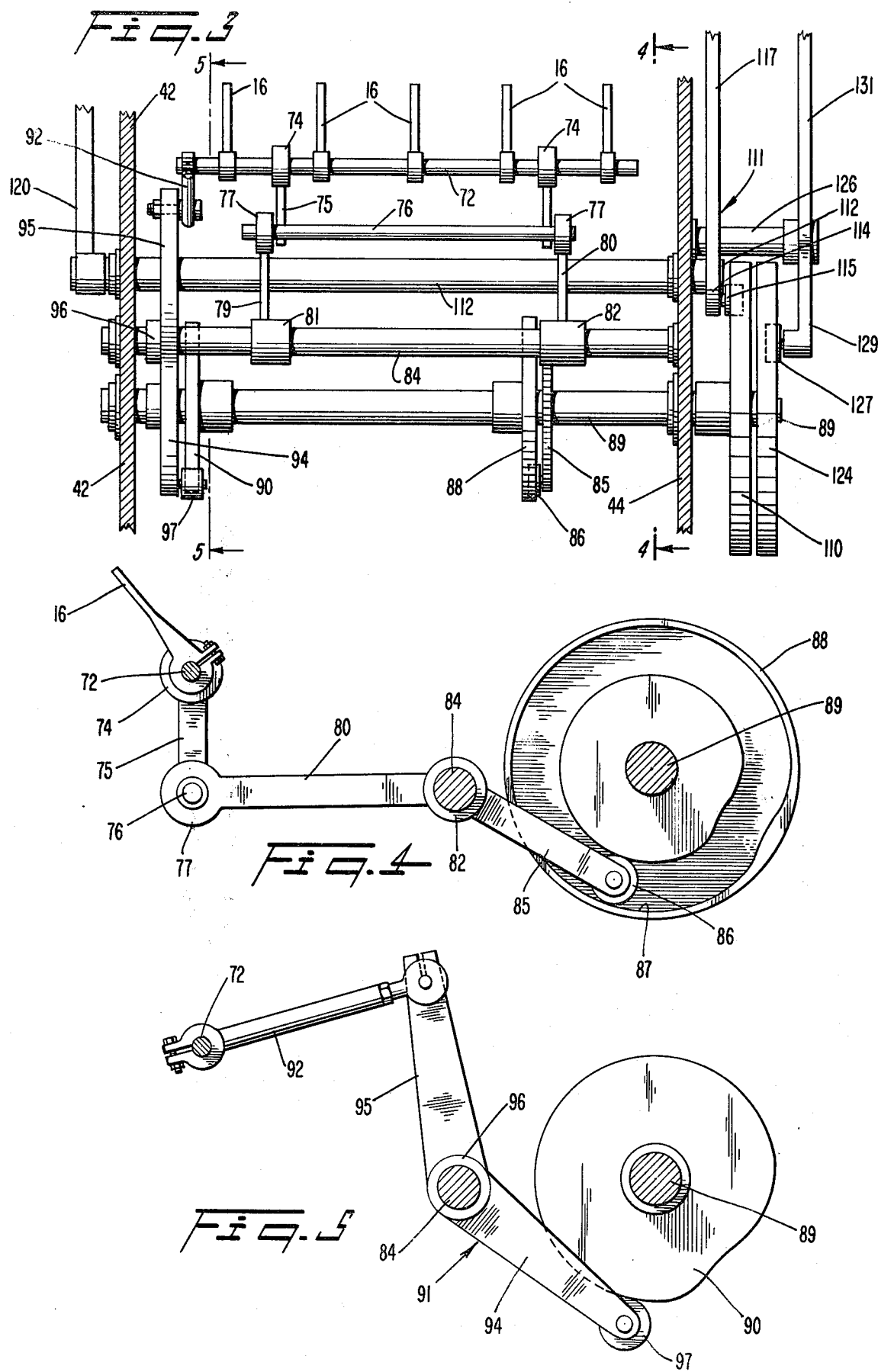

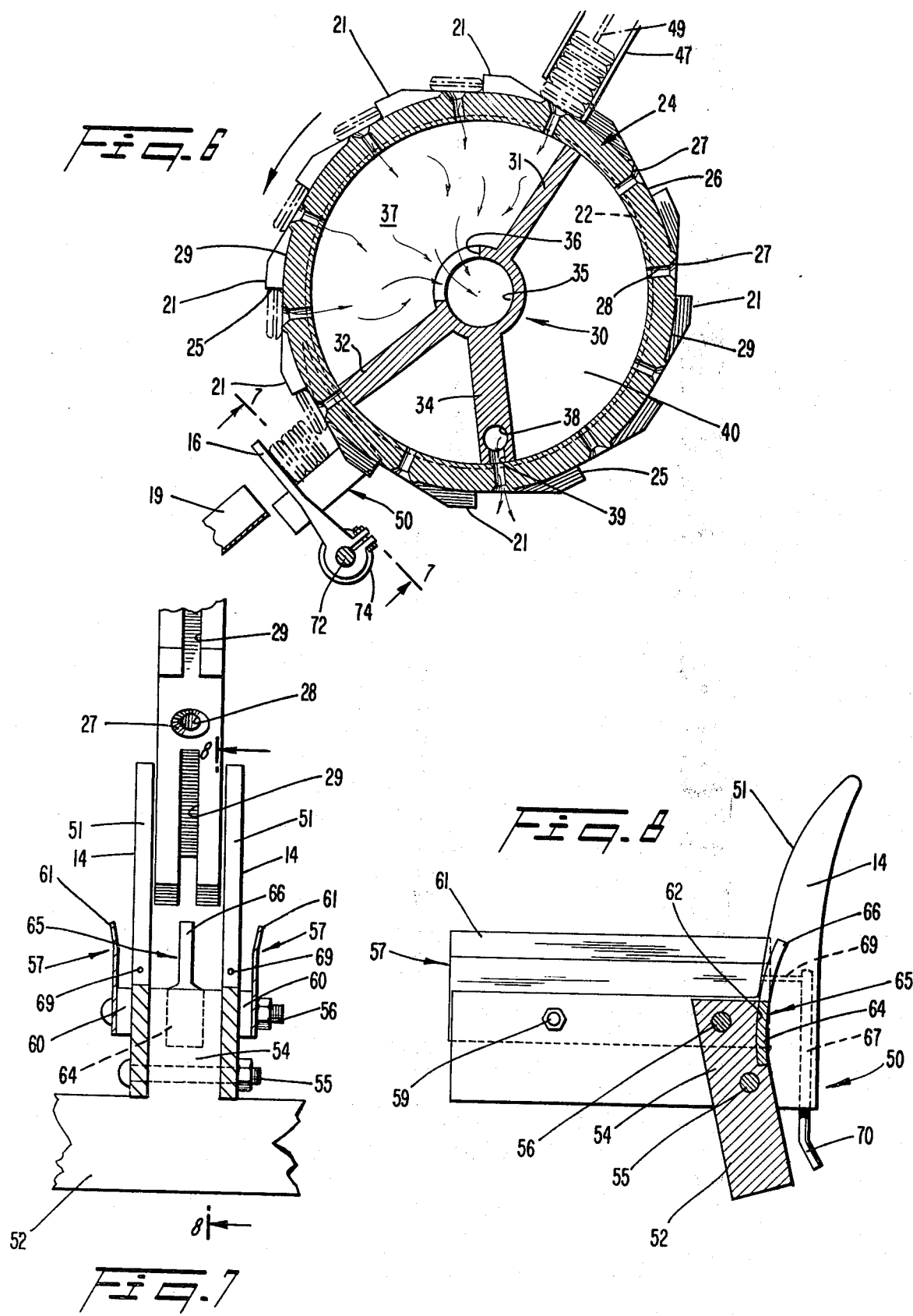

APPARATUS FOR GROUPING ARTICLES

BACKGROUND OF THE INVENTION

The present invention relates to articles loading machinery and, more particularly, to machinery for dividing a continuous flowing column of flat edge stacked articles into stacks of a predetermined count and depositing those stacks in conveyor buckets preparatory to packaging.

The machinery used to place sandwich cookies into stacks of predetermined count is commonly fed by an infeed chute which directs the flowing column from a horizontal to an inclined orientation. In the apparatus in general use at present, a destacking mechanism removes the cookies one at a time from the bottom of the chute and places them flat upon a conveyor which carries them to a stacking wheel arrangement. The stacking wheel stands the cookies on edge on a pair of inclined rails. A transfer mechanism is provided to move the counted stack into a conveyor bucket which carries the stacks to a packaging operation.

An example of such machinery is disclosed in U.S. Pat. No. 4,053,066 issued Oct. 11, 1977, to Joseph A. Lynch. In the apparatus disclosed in this patent and that employed prior to the development of that apparatus, the destacking operation is accomplished by the conveyor 12. This conveyor strips the cookies from the bottom of the infeed chute (not shown) and carries them toward the stacking wheel 17. An overhead conveyor 16 is required to transfer the cookies from the conveyor 12 to the stacking wheel. Therefore, three mechanisms (two conveyors and the stacking wheel) are necessary to transfer the cookies from the infeed chute to the inclined rails.

The size and cost of a machine is influenced by the number of the mechanisms which it contains and the unit cost of the operation performed by a machine can be reduced by reducing both its size and cost.

SUMMARY OF THE INVENTION

An object of the present invention is to provide article stacking and loading apparatus which is both simplified and compact and can be fabricated at reasonable cost.

The object of the invention is generally accomplished by providing article stacking apparatus comprising an infeed chute, a pair of inclined rails and a wheel for removing flat articles from the infeed chute and placing them directly on the rails. The wheel has a plurality of serrated teeth each of which has a generally radial surface for engaging the edge of the bottom article in the chute and a generally tangential surface provided with a vacuum port for carrying the articles from the chute to the rails. A wedge arrangement is mounted near the rails to move the articles outwardly from the wheel out of the path of the teeth.

BRIEF DESCRIPTION OF THE DRAWINGS

A preferred embodiment of the invention has been chosen for purposes of illustration and description and is shown in the accompanying drawings, forming a part of the specification wherein:

FIG. 1 is a side elevational view of apparatus according to the present invention.

FIG. 2 is an oblique front/top view taken along the line 2—2 on FIG. 1.

FIG. 3 is a view taken along line 3—3 on FIG. 1.

FIG. 4 is a sectional view taken along line 4—4 on FIG. 3.

FIG. 5 is a sectional view taken along line 5—5 on FIG. 3.

FIG. 6 is a sectional view taken along line 6—6 on FIG. 2.

FIG. 7 is a view taken along line 7—7 on FIG. 1.

FIG. 8 is a sectional view taken along line 8—8 on FIG. 7.

DESCRIPTION OF THE PREFERRED EMBODIMENT

With reference to the drawings, and particularly FIG. 1 thereof, there is shown article stacking and loading apparatus according to the present invention which generally includes an infeed chute 10, a pair of inclined rails 11 and a wheel 12 for picking articles from the chute 10 and delivering them to the inclined rails. A pair of wedge members 14 extend upwardly from the ends of the rails 11 to move the articles away from the wheel as they approach the rails. A bucket conveyor 15 is aligned with the rails to receive the stacks of cookies formed by the wheel. The stack is first supported by a finger 16 which extends upwardly between the rails and moves continuously away from the wheel as the stack is formed.

After a number of cookies are stacked on the rails, the finger 16 passes between a pair of downwardly extending fingers 17. The finger 16 then moves downwardly between the rails out of engagement with the cookies. The fingers 17 then guide the movement of the growing stack down the rails and into bucket 19 of the conveyor 15. When the stack is complete, the fingers are rapidly moved to position the stack fully within the bucket.

At a point when the stack is five cookies short of being complete, a gate lever 20 is operated to lift the infeed column upwardly out of the path of the teeth 21 of the wheel 12. Upon completion of the stack, the bucket conveyor 15 is placed in motion to bring empty buckets 19 into alignment with the rails 11. The operation of the lever 20 to block the flow of cookies to the wheel provides time for the conveyor 15 to be repositioned.

Referring now to FIGS. 2 and 6, the wheel 12 is composed of a tubular cylinder 22 formed with fine circumferential ridges 24 in which the teeth 21 are formed. The teeth 21 each have a generally radially oriented face 25 and a generally tangential flat surface 26. An air port 27 is provided in the surface 26 and a short bore 28 connects each port 27 to the interior of the tubular cylinder 22. Each tooth is formed with a groove 29 extending from the surface 25 to adjacent the port 27.

The cylinder 22 is mounted for rotation on a stationary axle 30 from which extends three radial vanes 31, 32 and 34. The ends of the vanes are in sealing contact with the inner surface of the tubular cylinder 22. The axle 30 is provided with a bore 35 extending inwardly from its left end (as viewed in FIG. 2). The left end of the axle is connected to a vacuum line not shown. A number of ports 36 are provided in the wall of the axle between vanes 31 and 32 to produce a vacuum in the chamber 37 defined by those vanes within the cylinder. The third vane 34 is provided with a horizontal bore 38 which is connected to a source of pressurized air through a radial passageway (not shown) at the right edge of that vane and an axial bore (not shown) at the right end of the axle 30 which extends to a pressure hose. A series of ports 39, laterally aligned with each ring of bores 28, extend from the bore 38 radially to the outer edge of the vane.

The ends of the cylinder 22 are sealed by circular end plates 40 and 41 which are journalled on the axle 30. The axle extends between side frame plates 42, 44. The wheel 12 is rotated on the axle by means of a gear 45 mounted on a tubular neck 46 which extends from the plate 41 through the side frame 44.

The infeed chute 10 as shown in FIGS. 1 and 2 consists of front and rear rail strips 47 which terminate short of the top edge of the teeth 21, and side rail strips 49 which extend down on each side of the teeth 21. The weight of the cookies in the chute and the pressure exerted by the conveyor feeding the chute force the cookies downwardly into the path of the teeth.

As each tooth passes the chute, the face 25 of the tooth engages the edge of the bottom cookie and strips it from the chute. The cookie is held against the surface 26 of the preceding tooth by a vacuum acting through the port 27 intersecting that surface. The vacuum holds the cookie in place on the wheel until the cookie is engaged by the wedge members 14. At that point the port 27 moves past the vane 32 and out of communication with the evacuated chamber 37 within the cylinder.

As shown in FIGS. 1, 7 and 8, each wedge member 14 and one of rails 11 are integrally formed from a generally "L" shaped piece of flat bar stock to provide a rail and wedge member 50. The wedges 14 extend upwardly from the inner end of the rails 11 and are formed with a curved camming surface 51. The members 50 are mounted on a horizontal bar 52 which extends between the frame plates. The bar 52 is formed with a flat sided projection 54 aligned with each row of teeth 21. A rail and wedge member 50 is secured to each side of each projection 54 by means of a pair of bolts 55 and 56.

A pair of guide plates 57 are mounted to the rails 11 by means of the bolt 56 and another bolt 59. Annular spacers 60 are positioned on the bolts 56 and 59 between the guide plates 57 and the rails 11. The upper edge portions 61 of the plates 57 are bent outwardly to guide cookies being deposited on the rails. The projections 54 are each formed with a recess 62 to accommodate the base section 64 of a central wedge member 65. The upper end of the wedge 65 is a curved finger 66 which extends into the grooves 29 beneath the cookies as the teeth 21 move past the rails 11.

To further assist the movement of the cookies from the teeth down the rails to the first finger or the stacked group of cookies supported thereby, each wedge member 14 is provided with means for directing an air blast at the edges of the cookies. Each wedge member 14 is provided with a longitudinal bore 67 and a transverse passageway 69 which intersects the camming surface 51 a short distance above the rail 11. A tube 70 is inserted in the bore 67 for a connection to a hose 71 that leads to a source of a continuous flow of pressurized air (not shown).

Referring to FIGS. 1 and 3 to 5, the first fingers 16 are rigidly fixed to a shaft 72. This shaft is journalled in two bearings 74 which are mounted on the ends of arms 75 that extend from a shaft 76 which is parallel to the shaft 72. The shaft 76 is journalled in a pair of bearings 77 mounted on the ends of a pair of arms 79, 80. The arms 79, 80 extend from sleeves 81, 82 which are keyed to a shaft 84 that are journalled in the side frame plates 42 and 44. A lever arm 85 extends from the sleeve 82 and carries a cam following roller 86 on the free end thereof. The roller 86 engages a groove 87 in a cam 88 that is mounted on a driven shaft 89 which is journalled in the side frame plates.

As can be seen from FIG. 4, the cam 88 raises and lowers the shaft 76 in an arc about the axis of the shaft 84. At the same time the arms 75 are rotated about the axis of the shaft 76 by a second cam activated mechanism comprising a cam 90, a lever 91 and an adjustable length link arm 92. The lever 91 has a pair of arms 94 and 95 extending from a hub 96 which is journalled on the shaft 84. A roller 97 on the end of arm 94 engages the surface of the cam 90. The link arm 92 is pivotally connected at one end to the end of the arm 95. The other end of the link arm 92 is keyed and clamped to the shaft 72.

The cams 88 and 90 are formed so that each finger 16 moves away from the wheel 12 between the rails 11 in an upright position (perpendicular to the rail) until it passes between the pair of downwardly extending fingers 17. The finger 16 then is moved downwardly out of the path of the stack of cookies and moves back toward the wheel 12 to its starting position.

The fingers 17 extend downwardly in pairs from a bar 99 which extends across the machine passing through slots 100 in the end plates. The ends of the bar 99 are rounded and journalled in formations 101 (FIG. 1) extending downwardly from sliding bearing blocks 102, 104 mounted on shafts 105 and 106 respectively. The shafts 105, 106 are mounted to the outer surfaces of the side plates 42, 44 by pairs of blocks 107 and 109.

The blocks 102, 104 are slid along the shafts 105, 106 by a mechanism operated by a cam 110 mounted on the shaft 89. That mechanism includes a lever 111 which is keyed to one end of a shaft 112 and has a short arm 114 carrying a roller 115 at the end thereof. The roller is positioned in a slot 116 formed in the face of the cam 110. The shaft 112 is journalled in the side plates 42, 44. The lever 111 has a long arm 117 which is connected to the block 104 by a long adjustable link rod 119. The ends of the link rod 119 are pivotally connected to the arm 117 and the block. A second arm 120 is mounted on the opposite end of the shaft 112 and is keyed thereto to move in unison with the lever 111. The arm 120 is connected to the block 102 by a long adjustable link rod 121 pivoted to the block and the end of the arm.

The rotational position of the fingers 17 with respect to the axis of the bar 99 is controlled by a mechanism operated by a cam 124 mounted on the driven shaft 89 next to the cam 110. A lever 125 is journalled on a stud 126 extending from the side plate 44 and carries a cam follower roller 127 on the end of a short arm 129. The roller 127 engages a slot 130 in the cam 124 and a long arm 131 of the lever 125 is pivotally connected to a long adjustable link rod 132. The other end of the rod 132 is pivotally connected to the end of a short arm 134 which extends upwardly from the bar 99 between the side plate 44 and the block 104. The cam 110 is formed to slide the blocks 102, 104 down the shafts 105, 106 at a steady rate until the fingers 17 reach the lower end of the bucket 19. At this point the cam 124 rotates the lever 131 clockwise to rotate the bar 99 and raise the fingers 17 into a horizontal position. The cam 110 operates the lever 111 to slide the blocks 102, 104 back up the shafts 105, 106 while the cam 124 holds the fingers in their horizontal position as they pass over the stack of cookies in the bucket 19. As shown in FIG. 2, the lower end wall 135 of the bucket is formed with a slot 136 to allow the fingers 17 to pass through the wall.

When the stack of cookies being formed on the rails 11 and in the bucket 19 is five cookies short of the predetermined stack count, the gate levers 20 are operated by a cam 137 to lift the infeed column out of the way of the teeth 21. The levers are mounted on and keyed to a shaft 139 which extends across the machine and is journalled in the side plates 42,44. A lever 20 is provided for each annular set of teeth. The ends of the levers 20 are forked to form prongs 140 positioned on each side of the row of teeth separated by a slot 141 through which the teeth pass when the levers are in their lower position. The cam 137 is mounted on a driven shaft 142. An operating lever 144, keyed to the shaft 139, carries a roller 145 which engages the cam 137. The cam 137 is shaped to lift the gate levers and hold them in the lifted position for a time period equal to that necessary to advance the bucket conveyor 15.

Referring to FIG. 1, the bucket conveyor 15 includes a series of buckets 19 mounted on pedestals 146 which are supported by an endless link conveyor extending between two sets of sprocket wheels 147, each set mounted on a shaft 149. The conveyor 15 transfers the stacks of cookies to a second similarly constructed bucket conveyor 150 which extends to packaging machinery.

It can be seen from the foregoing that the present invention provides article stacking and loading apparatus which is simple and compact and can be fabricated at reasonable cost.

As various changes may be made in form, construction and arrangement of the parts herein, without departing from the spirit and scope of the invention and without sacrificing its advantages, it is to be understood that all matter herein is to be interpreted as illustrative and not in any limiting sense.

We claim:

1. Article stacking apparatus comprising an infeed chute, a pair of inclined rails, a wheel for removing flat articles from the infeed chute and placing them on edge on said rails, said wheel being mounted about a generally horizontal axis and being formed with a plurality of serrated teeth on the outer edge thereof, each tooth having a generally radially oriented article engaging surface, and a generally tangentially oriented article receiving surface, said infeed chute extending downwardly to said wheel for delivering a column of flat articles into the path of said teeth, means for rotating said wheel so that each article engaging tooth surface in turn engages and removes the bottom article in the chute, vacuum means for holding the articles on the article receiving tooth surfaces as they are carried from said chute to said rails, wedge means mounted adjacent said rails for moving the articles away from the teeth, and a gate lever at the bottom end of said infeed chute, said lever being forked at one end thereof to provide two prongs separated by a slot, said prongs extending on each side of said teeth beneath the column of articles in said infeed chute, said teeth being received by said slot in said forked end of said lever, and cam means for operating said lever to lift said prongs engaging the bottom article in said infeed chute and lifting the infeed column out of the path of said teeth.

2. Apparatus according to claim 1 wherein said wedge means includes first and second wedge members each extending perpendicularly from one of said rails along the side of said teeth, said teeth being narrower than said articles, said wedge members having a camming surface for contacting the inner surface of the articles carried by said wheel, said camming surface extending from a point radially inwardly of the base of said article engaging surface to a point outwardly of the outer end of said engaging surface.

3. Apparatus according to claim 2 wherein said wedge means includes a central wedge member positioned between said first and second wedge members and extending generally parallel thereto, each of said teeth being provided with a circumferentially oriented slot for receiving the inner end of said central wedge member.

4. Apparatus according to claim 3 wherein air nozzle means are provided in said camming surface of said first and second wedge members to direct a continuous stream of pressurized air against articles moved from said wheel along said rails.

5. Apparatus according to claim 3 including a conveyor having buckets movable into alignment with said rails for receiving and carrying away the stacks of articles deposited on the rails, first finger means extending upwardly between said rails for maintaining the articles deposited on said rails in an upright position, means for moving said first finger means first along said rails away from said wheel and then downwardly out of engagement with said articles, second finger means positioned above the conveyor bucket aligned with the rails and extending downwardly to maintain the articles upright after said first finger is moved out of engagement therewith, and means for moving said second finger means the length of the conveyor bucket in engagement with said articles and then rotating said second finger means out of engagement therewith.

6. Article stacking apparatus comprising an infeed chute, a pair of inclined rails, a wheel for removing flat articles from the infeed chute and placing them on edge on said rails, said wheel being mounted about a generally horizontal axis and being formed with a plurality of serrated teeth on the outer edge thereof, each tooth having a generally radially oriented article engaging surface and a generally tangentially oriented article receiving surface, said infeed chute extending downwardly to said wheel for delivering a column of flat articles into the path of said teeth, means for rotating said wheel so that each article engaging tooth surface in turn engages and removes the bottom article in the chute, vacuum means for holding the articles on the article receiving tooth surfaces as they are carried from said chute to said rails, wedge means mounted adjacent said rails for moving the articles away from the teeth, a conveyor having buckets movable into alignment with said rails for receiving and carrying away the stacks of articles deposited on the rails, first finger means extending upwardly between said rails for maintaining the articles deposited on said rails in an upright position, means for moving said first finger means first along said rails away from said wheel and then downwardly out of engagement with said articles, second finger means positioned above the conveyor bucket aligned with the rails and extending downwardly to maintain the articles upright after said first finger is moved out of engagement therewith, means for imparting a reciprocating motion to said second finger means along the length of the conveyor bucket, and means for rotating said second finger means into and out of an article engaging position so that the articles are guided into the conveyor bucket and the second finger means passes over the articles during its return to the starting position adjacent the rails.

7. Apparatus according to claim 6, wherein said means for imparting reciprocating motion includes a pair of stationary shafts, a block sideably mounted on each of said shafts, a bar extending between said blocks and journalled therein, said second finger means extending downwardly from said bar, and cam operated means for sliding said blocks along said shafts.

8. Apparatus according to claim 7, wherein said means for rotating said second finger means includes an arm extending from said bar, a rod connected to said arm, and second cam operated means connected to said rod to rotate said bar.

* * * * *